US008256130B2

(12) United States Patent
Jantz

(10) Patent No.: US 8,256,130 B2
(45) Date of Patent: Sep. 4, 2012

(54) APPARATUS AND METHOD FOR PROPERLY PRE-MEASURING TURKEY FRYING OIL

(76) Inventor: Edward Lee Jantz, Jensen Beach, FL (US)

( * ) Notice: Subject to any disclaimer, the term of this patent is extended or adjusted under 35 U.S.C. 154(b) by 195 days.

(21) Appl. No.: 12/628,197

(22) Filed: Nov. 30, 2009

(65) Prior Publication Data
US 2010/0263221 A1 Oct. 21, 2010

Related U.S. Application Data

(63) Continuation-in-part of application No. 11/151,981, filed on Jun. 14, 2005, now abandoned.

(51) Int. Cl.
G01F 19/00 (2006.01)
A23L 1/01 (2006.01)
(52) U.S. Cl. ............ 33/679.1; 33/722; 116/227; 73/428
(58) Field of Classification Search .................. 33/679.1, 33/719, 722, 723, 729, 730; 73/290 B, 427, 73/428, 429; 99/342, 343; 116/227; D10/10.1, D10/46.2, 71
See application file for complete search history.

(56) References Cited

U.S. PATENT DOCUMENTS

| 62,866 | A | * | 3/1867 | McCann | 141/297 |
| 645,875 | A | * | 3/1900 | Strauss | 73/428 |
| 696,834 | A | * | 4/1902 | Mitchell | 73/428 |
| 1,172,810 | A | * | 2/1916 | Lewandowski | 33/485 |
| 1,199,103 | A | * | 9/1916 | Newmayer | 33/719 |
| 2,027,494 | A | * | 1/1936 | Trabold | 33/719 |
| 2,357,634 | A | * | 9/1944 | Crites | 219/440 |
| 2,468,987 | A | * | 5/1949 | Le Moyne | 73/428 |
| 2,607,122 | A | * | 8/1952 | Overmyer et al. | 33/723 |
| 2,793,530 | A | * | 5/1957 | Schultz et al. | 73/429 |
| 3,094,245 | A | * | 6/1963 | Mizuno | 222/43 |
| 3,672,061 | A | * | 6/1972 | Alessi | 33/833 |
| 3,705,012 | A | * | 12/1972 | Marmor et al. | 436/20 |
| 4,033,190 | A | * | 7/1977 | Hudspeth | 73/426 |
| 4,109,530 | A | * | 8/1978 | Kim | 73/427 |
| 4,445,370 | A | * | 5/1984 | Whitmire | 73/290 B |
| 4,550,602 | A | * | 11/1985 | Burke et al. | 73/428 |
| 4,773,316 | A | * | 9/1988 | Dougherty | 99/409 |
| 5,301,602 | A | * | 4/1994 | Ryczek | 99/345 |
| 5,445,023 | A | * | 8/1995 | Reed | 73/427 |
| 5,566,465 | A | * | 10/1996 | Zoellner et al. | 33/723 |

(Continued)

FOREIGN PATENT DOCUMENTS
SU 664807 A * 5/1979

Primary Examiner — R. A. Smith
(74) Attorney, Agent, or Firm — The Miller Law Offices PLC; Steven J. Miller, Esq.

(57) ABSTRACT

A way to safely fry turkeys by minimizing the hazard of overfilling oil, the Turkey Frying Oil Gauge (TFOG) comprises a device and method to properly pre-measure the frying oil used to fry whole turkeys. The Turkey Frying Oil Gauge is duel scale selectable for pot diameter and turkey weight. The turkey frying pot rim is measured and the size is selected on the gauge bottom. The mast is then slid out to view the weight of the turkey to be fried. The gauge is then placed in the bottom of the pot and frying oil is placed in the pot to the top of the gauge. The oil gauge is removed, the oil heated and the turkey introduced without overflowing the oil onto the heating flames.

7 Claims, 3 Drawing Sheets

U.S. PATENT DOCUMENTS

| | | | |
|---|---|---|---|
| 5,620,897 A * | 4/1997 | Zappe | 436/23 |
| 5,758,540 A * | 6/1998 | Davila et al. | 73/428 |
| 7,263,893 B2 * | 9/2007 | Kosmyna et al. | 73/726 |
| 2003/0154612 A1 * | 8/2003 | Petri et al. | 33/522 |
| 2007/0227245 A1 * | 10/2007 | Green et al. | 73/428 |
| 2007/0267412 A1 * | 11/2007 | Kosmyna et al. | 220/23.86 |

* cited by examiner

TURKEY FRYING OIL GAUGE

Part A (top view)                                   Part B (top view)

Part A                                              Part B

TURKEY FRYING OIL GAUGE

APPARATUS AND METHOD FOR PROPERLY PRE-MEASURING TURKEY FRYING OIL

CROSS REFERENCE TO RELATED APPLICATIONS

This continuation-in-part application claims priority from applicant's non-provisional application Ser. No. 11/151,981 filed on Jun. 14, 2005, which claimed priority from U.S. provisional patent application Ser. No. 60/579,645, filed Jun. 16, 2004, for TURKEY OIL GAGE.

STATEMENT REGARDING FEDERALLY SPONSORED RESEARCH OR DEVELOPMENT

Not Applicable

DESCRIPTION OF ATTACHED APPENDIX

Not Applicable

FIELD OF THE INVENTION

The present invention relates to frying turkeys and, more particularly, to the measurement of the frying medium with respect to the turkey frying vessel and the weight of the turkey being placed in the frying medium.

BACKGROUND OF THE INVENTION

The last 15 years has seen an explosion of frying turkeys in ones backyard. Fried turkeys cook quickly, yield an exceptionally crispy skin and remain juicy. Upon first frying a turkey, many say they will never cook a turkey any other way. The most common way to fry turkeys is outdoors, in a turkey frying pot. This pot is sold in various sizes and is taller than other commercial pots to facilitate the turkey's oblong shape. The most common size pots are 26, 28, 30, 32 and 34 quart capacities. The oil is most commonly heated in the pot over a gas flame until the oil reaches a temperature of 350 degrees. Upon reaching this temperature the turkey is immersed in the hot oil, usually using a carrier of one kind or other so ones hands would not contact the hot oil. The turkey is then cooked for 3-4 minutes per pound, removed from the oil, drained and consumed.

The process of frying can be dangerous due to the presence of flames and a flammable liquid. As stated, the typical process involves an open flame gas burner, heating a pot which contains oil, to a certain temperature and introducing the prepared turkey into the hot oil for an amount of time. The correct method of deciding how much oil to place in the pot is to place the turkey in the pot, cover with water, remove the turkey, record the level of the water and discard the water. Oil should then be placed to the recorded water level and heated. When this method is not performed the results can be hazardous. Of particular hazard is placing too much oil in the pot, and, as the turkey is immersed in the oil the pot will overflow onto the burner causing a flash fire. This hazard has caused much concern about the safety of frying turkeys due to initial overfilling of the frying oil. It is understood that some manufacturers may remove their turkey frying kits from the market. The Turkey Frying Oil Gauge (TFOG) was developed to minimize this hazard when frying by indicating a specific level to fill the oil for a particular size pot based on the weight of the turkey and to eliminate the need for the turkey/water displacement marking method.

No known measuring device has been developed that can be placed in any common size turkey frying pots that will indicate the level of oil to be placed in the pot.

Some newer pots contain embossed weight ranges of turkeys, but no known devices fit multiple vessels and indicate turkey weights to the nearest pound increment.

It is therefore an object of the invention to indicate a level of oil to be placed in a given size turkey frying pot to the correct level required for a particular size turkey.

It is another object of the invention to safely fry turkeys.

It is another object of the invention to reduce the likelihood of overfilling a turkey frying pot causing an unexpected fire It is another object of the invention to quickly fill a turkey oil frying pot without performing water displacement and marking the water level to indicate oil level.

It is another object of the invention to eliminate the guess work from placing frying oil in a turkey frying pot prior to frying a turkey.

SUMMARY OF THE INVENTION

As recited in the present invention, there is provided a way to safely fry turkeys by minimizing the hazard of overfilling oil.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENTS

Figure 1:
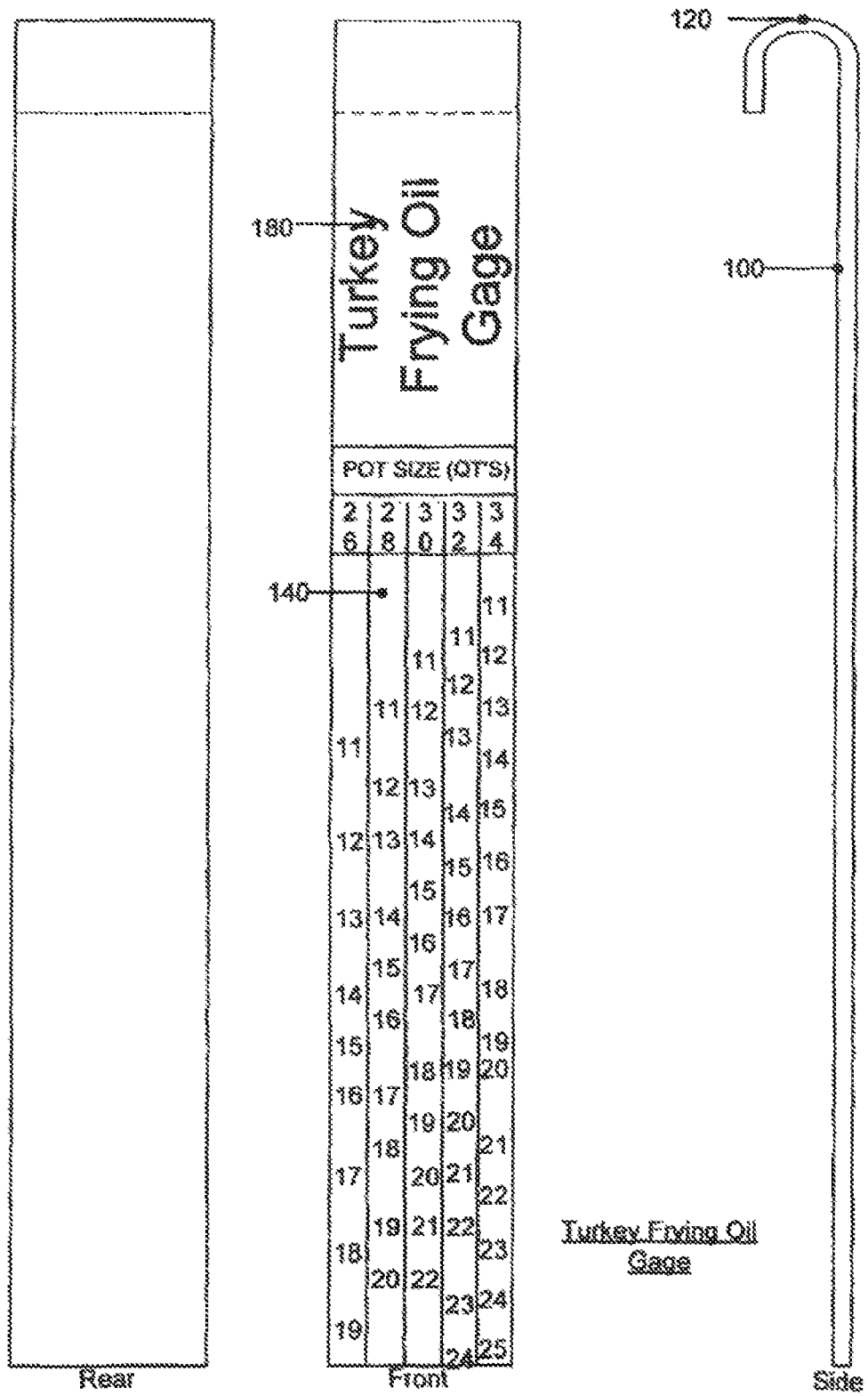
FIG. 1 comprises three elevation views of one embodiment of the invention which is supported at the top.

FIG. 1 is the elevation view of the front, back and side of the Turkey Frying Oil Gauge. The Turkey Oil Frying Gauge 180 is placed in a turkey frying pot and frying oil is placed the level indicated for the weight of the turkey being cooked for the size pot being used. The Turkey Oil Frying Gauge 180 may be made of wood, steel, aluminum, plastic or any other suitable material. As an alternative embodiment this gauge may recalculated to be placed on the bottom of turkey frying pots, said alternative embodiment being shown in FIG. 2, and operates in an almost identical manner to that described above in FIG. 1, except that the gauge is inverted.

The main body 100 of Turkey Oil Frying Gauge, a measurement scale 140 to measure the correct level to fill the frying pot. This main body 100 may be made of any material suitable for immersion in cooking oil in which uncooked poultry will be placed. The text, including numerals and symbols may be printed, etched, embossed, raised or indicated by any other means which is suitable for immersion in cooking oil in which uncooked poultry will be placed. The main body 100 must be rigid when placed in the pot containing cooking oil.

The Hanging Element 120 is on the top of the gauge and facilitates holding the gauge from the top of the frying pot. The Hanging Element 120 may be square, round or any other shape that will allow the gauge to be affixed to the top rim of the pot. The Hanging Element 120 may fit loosely or tightly and may attach or be attachable to the scale 140 or main body 100.

The scale 140 of the Turkey Oil Frying Gauge 180 indicates the level to which cooking oil will be placed. The scale 140 is headed with five (5) columns for five (5) turkey oil pot sizes or capacities. The turkey frying pot sizes are 26, 28, 30, 32 and 34 quart capacities. Under each column are numbers representing a range of sizes in pounds. The text, including numerals and symbols may be printed, etched, embossed, raised or indicated by any other means which is suitable for immersion in cooking oil in which uncooked poultry will be placed.

Thus, in summary, the Turkey Oil Frying Gauge 180 is hung from the top rim of a turkey frying pot and frying oil is placed the level indicated for the weight of the turkey being cooked for the size pot being used and removed. The oil is heated by various means, of which a gas burner is most common. When the oil reaches optimum cooking temperature, the turkey is slowly introduced into the hot oil to submersion. Using the Turkey Oil Frying Gauge 180 will assure that when the gauge is correctly used to fill the pot with oil, which the oil will not overflow onto the cooking flames causing a hazardous condition and unnecessarily wasting of cooking oil.

Figure 2:
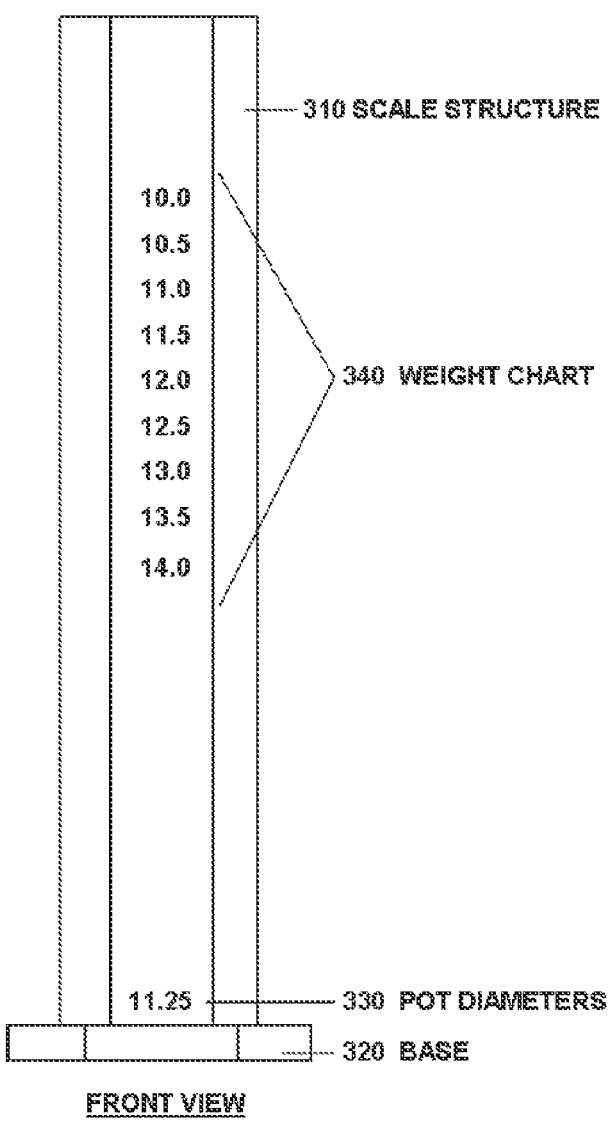
FIG. 2 comprises section and elevation views of another embodiment of the invention, which is supported at the bottom.

Referring to another alternate embodiment, as already mentioned above and as shown in FIG. 2, is one which is essentially operates the same as FIG. 1, except that it is inverted and supported at the bottom, rather than at the top. FIG. 2 is the front elevation view of the gauge 310. Main body 310 is supported by base 320 which holds main body 310 in a stable vertical position. Base 310 accepts main body 310 as countersunk into base 320. Base 320 will be designed as wide as necessary to provide stability.

Main body 310 comprises of Pot Diameters 330, Turkey Weights 340 and is supported by Base 320. Main Body 310 uses its shape to carry twelve selectable turkey frying pot diameters (330) at the base of main body 320. Above each selectable Pot Diameter (330) are individually selectable Turkey Weights (340). The proprietary height of Main Body 310 along with proprietary elevation of selectable Turkey Weights 340 results in a physical height to fill a particular frying pot with oil. Main Body 310 may be constructed of any solid material.

Pot Diameters 330 are located at the bottom of Main Body 310. Pot Diameters 330 are selectable in inches and may be etched, printed, painted or otherwise marked Main Body 220.

Turkey Weights 340 are located on Main Body 310 above each of Pot Diameters 330. Turkey Weights 340 range from 10 to 16 pounds and are located at proprietary heights as when selected, results in a physical height to fill a particular frying pot with oil. Text of Turkey Weights 340 may be etched, printed, painted or otherwise marked Main Body 310.

Place the Turkey Frying Oil Gauge in the bottom of the turkey frying pot and fill the pot with frying oil to the full height of the Turkey Frying Oil Gauge. Remove the gauge, heat the oil and fry turkey using conventional methods.

Figure 3:
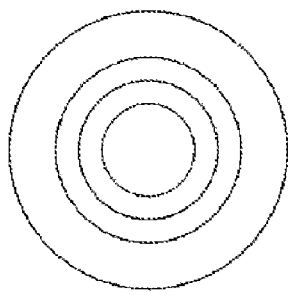
FIG. 3 comprises section and elevation views of another embodiment of the invention, supported at the bottom, and having an additional slider mechanism.
Figure 3:
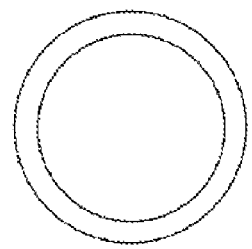
Figure 3:
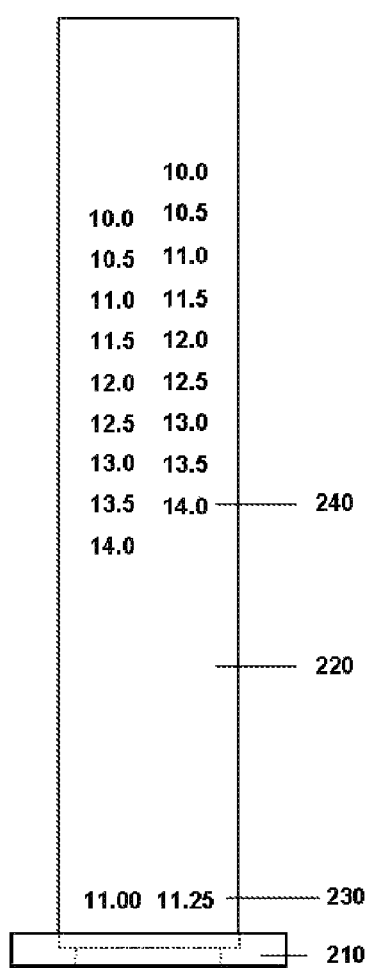
Figure 3:
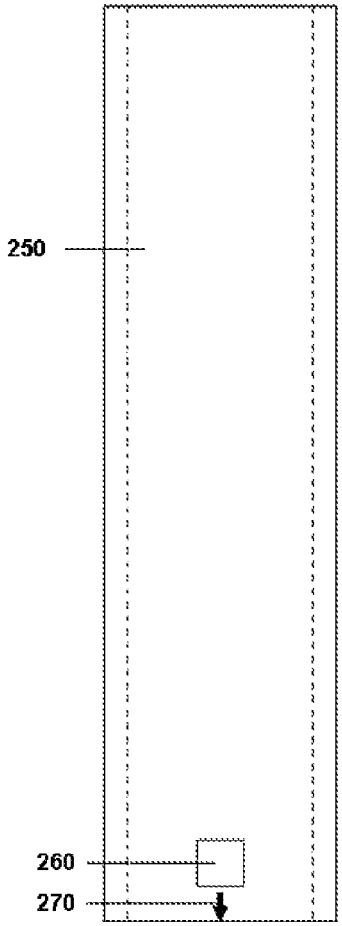

Referring to another alternate embodiment having an additional 'slider mechanism' as illustrated in FIG. 3, Part A is the front elevation view of the gauge 220. Main body 220 is supported by base 210 which holds main body 220 in a stable vertical position. Base 210 accepts base 220 as countersunk into base 210. Base 210 will be designed as wide as necessary to provide stability.

Main body 220 comprises of Pot Diameters 230, Turkey Weights 240 and is supported by Base 210. Main Body 220 uses its shape to carry twelve selectable turkey frying pot diameters (230) at the base of main body 220. Above each selectable Pot Diameter (230) are individually selectable Turkey Weights (240). The proprietary height of Main Body 220 along with proprietary elevation of selectable Turkey Weights when used with Part B (250) results in a physical height to fill a particular frying pot with oil. Main Body 220 may be constructed of any solid material.

Pot Diameters 230 are located at the base of Main Body 220. Pot Diameters 230 are selectable from 11.00 inches to 13.75 inches and may be etched, printed, painted or otherwise marked Main Body 220.

Turkey Weights 240 are located on Main Body 220 above each of Pot Diameters 230. Turkey Weights 240 range from 10 to 16 pounds and are located at proprietary heights as when selected and used with Part B (250), results in a physical height to fill a particular frying pot with oil. Text of Turkey Weights 240 may be etched, printed, painted or otherwise marked Main Body 220.

Gauge Extension 250 shown wholly as Part B is comprised of Turkey Weight Selection Window 260 and Indicator Arrow 270. It is the intent of Gauge Extension 250 to fit snuggly over Part A, Main Body 220. Gauge Extension 250 will be assembled onto Main Body 220 and brought down to the base of Main Body 220. When in use, Indicator Arrow 270 will be pointed to Pot Diameter 230 and the Gauge Extension 250 slid outwardly to select the Turkey Weight 240 as viewed through the Turkey Weight Selection Window 270.

Turkey Weight Selection Window 260 on Gauge Extension 250 is used to select Turkey Weights 240 by being comprised of a space through the material of Gauge Extension 250. Gauge Extension 250 is slid along Main Body 220 over Turkey Weights 240 until desired Turkey Weight is found through Turkey Weight Selection Window 260. The shape of The Turkey Weight Selection Window may vary.

Indicator Arrow 270 is located on Gauge Extension 250, below and centered upon Turkey Weight Selection Window 260. The intention of Indicator Arrow 270 will be to positively select and individual Pot Diameter. Indicator Arrow 270 may be etched, printed, painted or otherwise marked on Gauge Extension 250.

The Turkey Frying Oil Gauge is comprised of Part A and Part B, assembled and used as one devise. Gauge Extension 250 assembled onto Main Body 220 and brought down to the Base 210 of Main Body 220. To use, point Indicator Arrow 270 to the Pot Diameter 230 for the turkey frying pot engaged in use. Slide Gauge Extension 250 outwardly along the selected Pot Diameter 230 to select an explicit Turkey Weight 240 as viewed through the Turkey Weight Selection Window 270. Place the Turkey Frying Oil Gauge in the bottom of the turkey frying pot and fill the pot with frying oil to the full height of the Turkey Frying Oil Gauge. Remove the gauge, heat the oil and fry turkey using conventional methods.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention:

Having thus described the invention, what is desired to be protected by Letters Patent is presented in the subsequently appended claims.

What is claimed is:
1. An apparatus for properly pre-measuring turkey frying oil, comprising:

a main body, said main body having a plurality of selectable pot diameters or pot sizes thereon, said main body having a plurality of selectable turkey weights thereon, wherein a combination of a selected turkey weight from said plurality of selectable turkey weights and a selected pot diameter or pot size from said plurality of selectable pot diameters or pot sizes define a level of frying oil from a bottom of a pot having said selected pot diameter or pot size for a turkey having said selected turkey weight.

2. The apparatus as in claim 1, wherein a hanging element supports the main body in a substantially vertical fashion.

3. The apparatus as in claim 1, wherein a base supports the main body in a substantially vertical fashion.

4. A method for the measurement of oil to fry a turkey accurately prior to introducing the turkey into hot oil, said hot oil being heated in a pot over an open flame thus mitigating the danger associated with flash fire, compromising the steps of:

providing a turkey frying oil gauge having a main body, said main body having a plurality of selectable pot diameters or pot sizes thereon, said main body having a plurality of selectable heights defined by different turkey weights for each of said selectable pot diameters or pot sizes, inserting the turkey frying oil gauge into said pot, visually selecting a pot diameter or pot size which corresponds to said pot from said plurality of selectable pot diameters or pot sizes, filling the pot with frying oil to a selected height of the plurality of selectable heights which corresponds to the weight of said turkey and the pot diameter or pot size, and removing said gauge from the oil filled pot and commencing the turkey frying process.

5. The method recited in claim 4, wherein the physical displacement of the gauge in the oil is inconsequential.

6. The method recited in claim 4, wherein the gauge is self-draining.

7. An apparatus for properly pre-measuring turkey frying oil, comprising:

a main body, said main body having a plurality of selectable pot diameters or pot sizes thereon, said main body having a plurality of selectable heights or levels thereon indicated by different turkey weights for each of the plurality of selectable pot diameters or pot sizes, wherein a combination of a selected turkey weight from said plurality of selectable turkey weights for a selected pot diameter or pot size from said plurality of selectable pot diameters or pot sizes define a height or level of frying oil from a bottom of a pot, said pot having said selected pot diameter or pot size for a turkey having said selected turkey weight.

\* \* \* \* \*